United States Patent
Cocuzza et al.

(10) Patent No.: US 10,472,992 B2
(45) Date of Patent: Nov. 12, 2019

(54) ON-DEMAND STEAM GENERATOR AND CONTROL SYSTEM

(71) Applicant: Enviro Power LLC, Middletown, CT (US)

(72) Inventors: Michael A. Cocuzza, Middletown, CT (US); Patrick J. Emerick, Southington, CT (US)

(73) Assignee: ENVIRO POWER LLC, Middletown, CT (US)

( * ) Notice: Subject to any disclaimer, the term of this patent is extended or adjusted under 35 U.S.C. 154(b) by 799 days.

(21) Appl. No.: 14/479,184

(22) Filed: Sep. 5, 2014

(65) Prior Publication Data
US 2015/0059660 A1 Mar. 5, 2015

Related U.S. Application Data

(60) Provisional application No. 61/873,994, filed on Sep. 5, 2013.

(51) Int. Cl.
*F01K 9/00* (2006.01)
*F01K 13/02* (2006.01)
(Continued)

(52) U.S. Cl.
CPC .............. *F01K 9/003* (2013.01); *F01K 13/02* (2013.01); *F22B 1/18* (2013.01); *F22B 3/04* (2013.01);
(Continued)

(58) Field of Classification Search
CPC .. F01K 9/003; F01K 13/02; F22B 1/18; F22B 3/04; F22B 27/08; F22B 27/16; Y02E 20/14
(Continued)

(56) References Cited

U.S. PATENT DOCUMENTS

| 379,421 A | 3/1888 | Serpollet |
| 1,675,600 A | 7/1928 | Doble |

(Continued)

FOREIGN PATENT DOCUMENTS

| EP | 2056034 A2 | 5/2009 |
| JP | 2012-163279 A | 8/2012 |
| JP | 2012-251697 A | 12/2012 |

OTHER PUBLICATIONS

International Search Report and Written Opinion dated Feb. 17, 2015 (PCT/US2014/054416).
(Continued)

*Primary Examiner* — Steven B McAllister
*Assistant Examiner* — Benjamin W Johnson
(74) *Attorney, Agent, or Firm* — Alix, Yale & Ristas, LLP (57) ABSTRACT

The disclosed apparatus and control system produces a single, on demand, energetic gaseous working fluid from any heat source. Working fluid in a liquid phase is released into a heat exchange tube in the form of very fine droplets or atomized mist, where it is rapidly heated to its gaseous phase. The gaseous working fluid can continue to absorb heat before exiting the heat exchange tube to perform work. The disclosed system controls the release of working fluid into the heat exchange tube and/or the heat energy to which the tube is exposed, resulting in a flow of energetic gaseous working fluid that can be quickly adjusted in response to changing conditions without a large pressure vessel.

15 Claims, 6 Drawing Sheets

(51) Int. Cl.
*F22B 1/18* (2006.01)
*F22B 3/04* (2006.01)
*F22B 27/08* (2006.01)
*F22B 27/16* (2006.01)

(52) U.S. Cl.
CPC .............. *F22B 27/08* (2013.01); *F22B 27/16* (2013.01); *Y02E 20/14* (2013.01)

(58) Field of Classification Search
USPC ................................. 122/35, 406.4; 166/303
See application file for complete search history.

(56) References Cited

U.S. PATENT DOCUMENTS

| | | | |
|---|---|---|---|
| 2,367,870 A | | 1/1945 | Joslyn |
| 3,478,726 A | * | 11/1969 | Kikinis ................. F22B 29/023 |
| | | | 122/406.1 |
| 3,642,384 A | | 2/1972 | Huse |
| 3,954,087 A | * | 5/1976 | Stevens .................. F22B 29/12 |
| | | | 122/406.1 |
| 4,287,430 A | * | 9/1981 | Guido ....................... F01K 3/22 |
| | | | 290/40 C |
| 4,290,389 A | * | 9/1981 | Palchik ................. F22B 35/125 |
| | | | 122/1 R |
| 4,573,323 A | | 3/1986 | Mock |
| 4,715,192 A | | 12/1987 | Katz |
| 6,089,837 A | | 7/2000 | Cornell |
| 6,543,480 B1 | | 4/2003 | Mazzei et al. |
| 6,598,397 B2 | | 7/2003 | Hanna et al. |
| 6,629,412 B1 | | 10/2003 | Labinov et al. |
| 7,211,906 B2 | | 5/2007 | Teets et al. |
| 7,743,872 B2 | | 6/2010 | Brookman |
| 7,882,692 B2 | | 2/2011 | Pronske et al. |
| 8,459,391 B2 | | 6/2013 | Brookman et al. |
| 8,497,452 B2 | | 7/2013 | Evans |
| 9,217,370 B2 | | 12/2015 | Wang et al. |
| 2003/0213246 A1 | | 11/2003 | Coll et al. |
| 2003/0213248 A1 | | 11/2003 | Osborne et al. |
| 2003/0213854 A1 | | 11/2003 | Stickford et al. |
| 2004/0144093 A1 | | 7/2004 | Hanna et al. |
| 2008/0229747 A1 | | 9/2008 | Yatsuzuka et al. |
| 2008/0271454 A1 | | 11/2008 | Hansen |
| 2008/0282701 A1 | | 11/2008 | Komaki et al. |
| 2010/0154725 A1 | * | 6/2010 | Janvier .................... F01K 1/00 |
| | | | 122/35 |
| 2010/0242476 A1 | | 9/2010 | Ast et al. |
| 2013/0161009 A1 | * | 6/2013 | Price ................... E21B 43/2406 |
| | | | 166/303 |
| 2013/0241204 A1 | | 9/2013 | Brookman et al. |
| 2013/0284717 A1 | | 10/2013 | Evans |
| 2015/0267568 A1 | | 9/2015 | Hikichi et al. |
| 2017/0183977 A1 | | 6/2017 | Brune et al. |

OTHER PUBLICATIONS

"CRES Inline-Instant Steam Generator," Brochure, Infinity Fluids Corporation, Worcester, MA.

* cited by examiner

ON-DEMAND STEAM GENERATOR AND CONTROL SYSTEM

BACKGROUND

The disclosure relates to devices and methods for generating controlled flows of energetic working fluids without a pressure vessel.

Phase-change working fluids are commonly used to translate heat energy into useful work or to transport heat from one location to another. The use of water as a working fluid where heat energy is absorbed to change water into steam that is then used to perform work is well-known. Other working fluids such as refrigerants may be employed in a similar fashion. Many prior art energy translation systems employ a boiler to heat large quantities of water to generate a flow of steam that can then be used to move heat energy from the boiler to another location (as in steam heat systems) or to perform work (as in steam engines, turbines, etc.). The reserve of steam available in a pressure vessel allows systems to respond quickly to changes in demand through controlled release of steam from the pressure vessel. The energy stored in such pressure vessels presents significant hazards and may require special siting permits from state and local governments as well as dedicated staff to monitor and operate such systems.

There is a need for a non-boiler steam source that is capable of providing a consistent flow of steam that is responsive to changing conditions.

SUMMARY

The disclosed apparatus and control system produces a single, on demand, energetic gaseous working fluid from any heat source. Working fluid in a liquid phase is released into a heat exchange tube in the form of very fine droplets or atomized mist, where it is rapidly heated to its gaseous phase. The gaseous working fluid can continue to absorb heat before exiting the heat exchange tube to perform work. The disclosed system controls the release of working fluid into the heat exchange tube and/or the heat energy to which the tube is exposed, resulting in a flow of energetic gaseous working fluid that can be quickly adjusted in response to changing conditions without a large pressure vessel. As used in the context of this application, "heat exchange tube" means a structure having a large surface area relative to its internal volume to facilitate heat exchange between a source of heat energy and the working fluid inside the heat exchange tube. Heat exchange tube is not limited to an elongated tubular shape in the traditional sense, and should be interpreted broadly according to the definition given above. Whatever the shape of the heat exchange tube, it is necessary that the tube be capable of containing the working fluid during transition from liquid to gas and also to contain the gaseous working fluid up to the maximum working pressure of the system, including a margin of safety.

Heat may be generated by means of external combustion from any fuel such as natural gas, wood, garbage, etc. External combustion has many advantages relative to internal combustion, with the main advantage being that such systems are fuel agnostic. Any fuel that provides heat can be used to produce work in conjunction with the disclosed apparatus and control systems, whereas internal combustion requires a specifically refined fuel. The disclosed apparatus and control systems are not limited to external combustion as a source of heat. The disclosed concepts are compatible with any form of heat, including but not limited to waste heat in the exhaust from internal combustion engines, furnaces, kilns, etc. The term "heat exchanger" as used in this application applies to any arrangement configured to facilitate movement of heat from one fluid to another and includes liquid to gas, liquid to liquid, and gas to gas heat exchangers. Heat exchangers are configured for specific installed environments and take many forms that are well-understood to those skilled in the art, all of which are encompassed by the term "heat exchanger" as used in this application.

The disclosed embodiments employ water as the working fluid, but the apparatus, methods and concepts are not limited to only water as a working fluid. Other mediums have, however, been proposed for two-phase vapor-liquid power systems, including but not limited to ammonia, freon, isobutane, and isopentane. Any fluid with a phase change from a liquid to a gas by means of heat transfer may be compatible with the present disclosure, however water steam has properties that are particularly beneficial in the context of the disclosures. The gaseous phase of the working fluid is employed as an energetic fluid to do work (for example, to generate electricity) through an expander (turbine, piston engine, etc.) or to produce a controlled flow of heated working fluid for process applications. Past methods for generating a controlled flow of steam require a boiler which accumulates steam in a pressure vessel and releases steam from the pressure vessel as desired to perform work. Maintaining a reservoir of steam means that additional demand can be quickly met by releasing additional steam from the reservoir. However maintaining a large reservoir of pressurized steam is less efficient than generating steam on-demand in response to changing system conditions. Additionally, the large reservoir of steam presents safety risks that add to the cost and complexity of such systems.

The present disclosure relates to a system that generates on demand steam from controlled release of atomized water into a heat exchanger to create steam, and uses a control system to regulate the flow of atomized water and the heat energy to which the atomized water is exposed. The resulting flow of steam can be controlled in terms of its quantity, temperature and pressure and used to perform a desired work or process. Due to the very large expansion of water when it becomes steam, the volume and properties of the steam generated in such a system will tend to fluctuate, which is undesirable. An electronic control system regulates the flow of atomized water into the heat exchanger and the heat energy applied to the heat exchanger to produce a steady flow of steam at a desired temperature and pressure. Information from pressure and temperature sensors at the output of the heat exchanger is employed by the control system to stabilize the steam output in a feedback arrangement. In addition to generating a steady state flow of steam, the disclosed apparatus and control system is capable of increasing or decreasing the flow of steam in response to system inputs calling for decreased or increased work. The control system regulates the mass flow of water and the heat delivered to the heat exchanger, which allows the system to fluctuate to any desired power output (within equipment limits).

DETAILED DESCRIPTION OF THE DISCLOSED EMBODIMENTS

Figure 1:
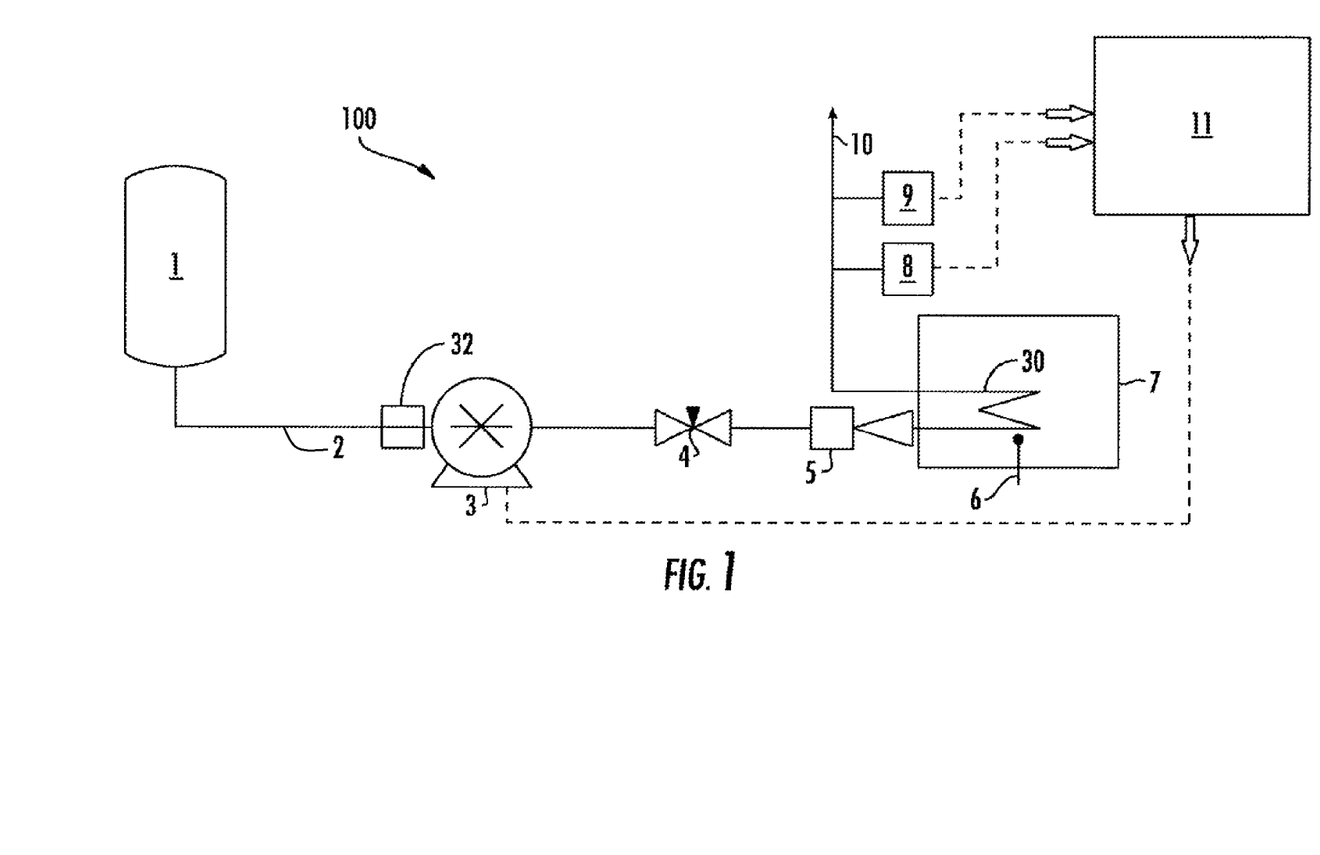
FIG. 1 is a block diagram of a basic on demand steam generating apparatus and control system according to aspects of the disclosure.

FIG. 1 illustrates a basic on demand steam generating system according to aspects of the disclosure. The system 100 includes a water tank 1, water pump 3, check valve 4 and atomizing nozzle 5 are arranged to deliver atomized water into a heat exchanger 6 within a combustion chamber 7. Liquid water 2 is pressurized by water pump 3 to produce a pressure differential across nozzle 5, resulting in liquid water entering the heat exchanger 6 in the form of a fine mist of atomized water. Atomization nozzles require a minimum differential pressure to create a stream of atomized particles leaving the nozzle tip. If the minimum pressure is not met, water will tend to dribble out the nozzle tip, not atomize into a mist of fine water droplets. In the disclosed embodiment, the minimum differential pressure is approximately 10 psi. This pressure differential represents the starting point of atomization and the differential pressure is then increased to reach the mass flow of water through the nozzle necessary to generate the desired volume of steam 10, as described below.

Figure 3:
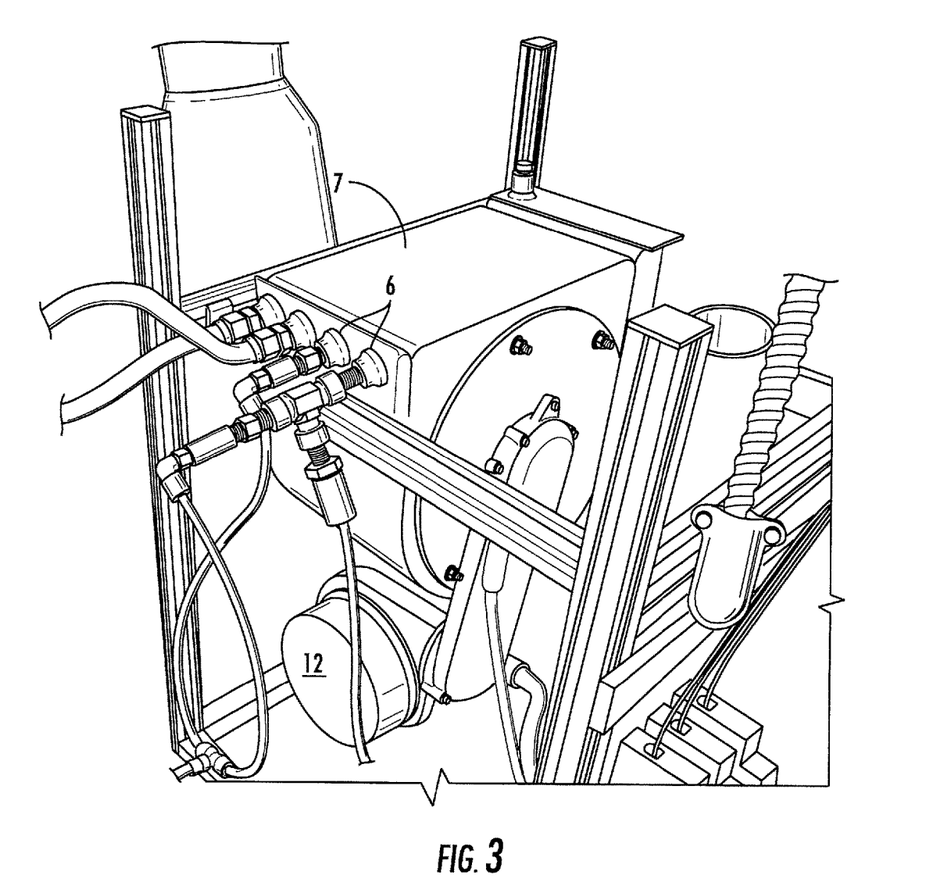
FIG. 3 is a perspective view of a heat exchanger showing input and output couplings according to aspects of the disclosure.

The atomized water delivered to the heat exchanger 6 absorbs heat energy sufficient to change phase to steam, expanding rapidly as a result. The steam continues to absorb heat as it moves away from the water injection nozzle 5 along one or more heat exchange tubes 30. In the disclosed embodiment, the heat exchanger 6 and combustion chamber 7 are similar to that employed in a natural gas condensing boiler, with one or more coiled heat exchange tubes 30 arranged in a combustion chamber 7 such as that illustrated in FIG. 3. The atomizing nozzle 5 is arranged at or near an otherwise closed end of the tube 30. As injected atomized water transitions to steam, it expands to greater than 1000 times the liquid volume, filling the tube with steam. As newly injected water is converted to steam, new steam displaces steam already in the tube 30, producing a flow of steam 10 away from the water atomizing nozzle 5. Atomizing the water before injection into the heat exchanger 6 decreases the time necessary to transition from liquid water to steam. The length of the tube 30 into which the water is injected allows the steam to continue to absorb heat as it moves away from the nozzle 5, becoming dry, superheated steam that is ideal for use in a variety of expanders to perform work. Pressure and temperature sensors 8, 9 are arranged at the outlet of the heat exchanger 6 and provide corresponding pressure and temperature signals to a controller 11. The controller 11 adjusts operation of water pump 3 to maintain the differential pressure across nozzle 5 and to control the mass flow of water injected into the heat exchange tube 30. Assuming the presence of sufficient heat energy to convert injected atomized water into steam, increased differential pressure across nozzle 5 results in increased mass flow of water into heat exchange tube 30 and increased volume of steam 10 at the outlet of the heat exchanger 6.

In the disclosed on demand steam generators, the pump 3 is driven by a brushless direct current (BLDC) motor 32 in which the torque is proportional to the applied power and is adjustable using pulse width modulation (PWM). The controller 11 adjusts the power applied to the pump motor 32 to vary the pressure differential across the nozzle 5. The controller 11 is programmed to deliver a flow of atomized water through the nozzle 5 sufficient to meet demand for steam at the outlet of the heat exchanger 6. Pressure and temperature sensors 8, 9 detect the pressure and temperature of steam at the outlet of the heat exchanger 6 and send corresponding pressure and temperature signals to the controller 11. The controller 11 uses the pressure and temperature signals to vary power applied to the water pump motor 32, with increased power resulting in increased mass flow of water through nozzle 5. The relationship between power applied to the water pump motor 32 and the mass flow of water through nozzle 5 can be established by experimentation and used in the controller program, resulting in predictable delivery of atomized water into the heat exchanger 6. In an alternative arrangement, a mass flow sensor can be arranged to detect the flow of water through the nozzle 5 and a signal corresponding to the measured mass flow employed by the controller to adjust operation of the water pump motor.

Figure 6:
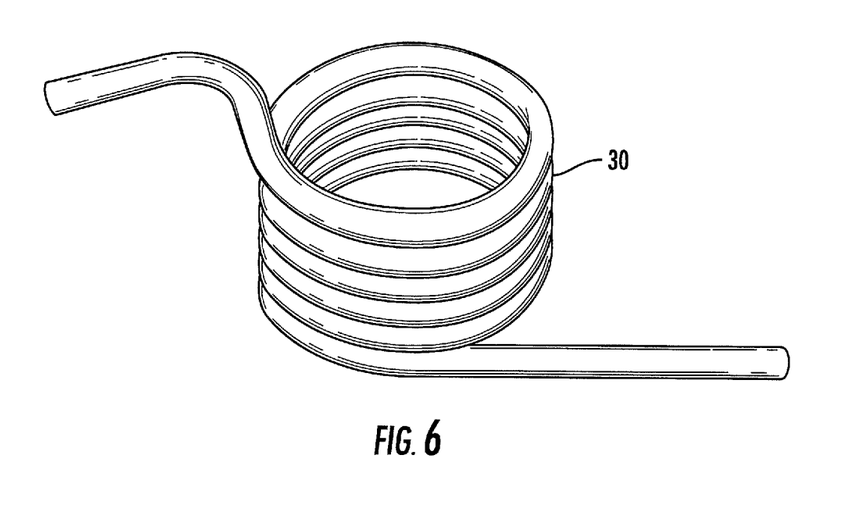
FIG. 6 is a simplified example of a heat exchanger tube according to aspects of the disclosure.

FIG. 6 illustrates a simple heat exchange tube having a circular cross section. Any heat exchange tube configuration is compatible with the disclosed system, so long as the tube has sufficient strength to contain the steam at the pressure level needed by the expander attached to the output of the heat exchanger 6. One example of an expander is a 1.2 Kw steam turbine driven generator manufactured by Green Turbine, which requires approximately 0.004 Kg per second of superheated dry steam at a temperature of approximately 350°-400° F. and pressure of about 75 psi. Steam that is too cool and wet or steam that is too hot will result in damage to the turbine 15, so control of the steam parameters of temperature and pressure is needed.

Figure 2:
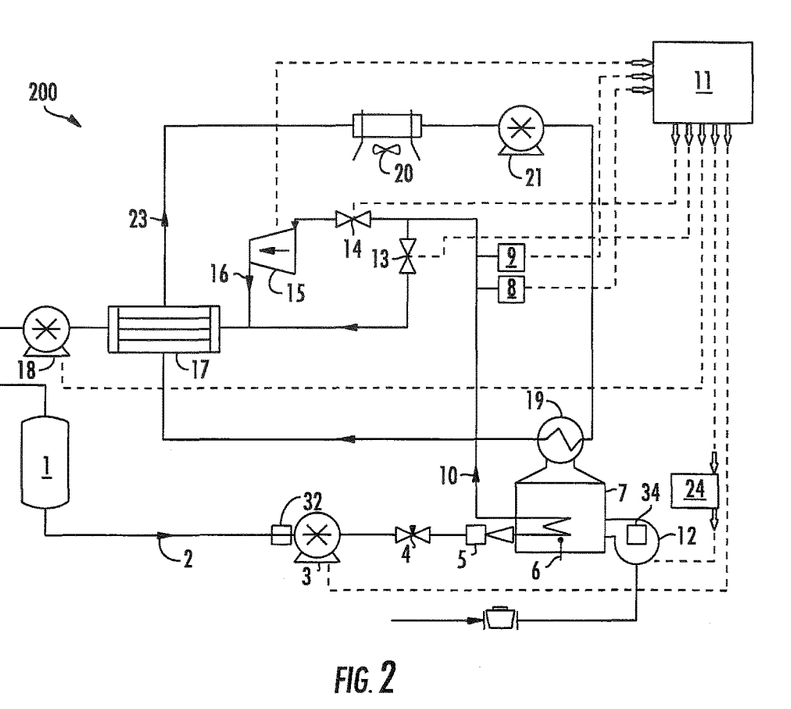
FIG. 2 is a block diagram of an on demand steam generating system arranged to generate electricity and supplementary heat in a combined heat and power arrangement according to aspects of the disclosure.

The following general description presumes that the heat exchanger 6 is preheated and surrounded by a source of heat energy sufficient to transition the injected atomized water to steam. The heat may be generated by a burner combusting fuel under the direction of the controller 11, 24 as shown in FIG. 2, in which case the controller 11, 24 would fire the burner to pre-heat the chamber 7 surrounding the heat exchanger 6. When the system receives a signal to generate steam, the controller sends a signal to water pump 3 to transport water 2 to the water atomization nozzle 5 under pressure. An atomized flow of water is generated by the distinct geometry of the nozzle 6 and differential pressure across the nozzle. One non-limiting example of a suitable nozzle is injection nozzle #40225 from Snow Performance of Woodland Park, Colo., which is capable of atomizing about 225 ml of water per minute, assuming adequate differential pressure across the nozzle 5. The nozzle 5 can be located outside or inside the chamber 7. Locating the nozzle 5 inside the chamber 7 will allow the water 2 moving through the nozzle 5 to absorb heat before it atomizes, decreasing the time necessary for the phase change to steam. It is an objective of the control system that the atomized water absorbs sufficient energy and phase change to steam before it can collect as water droplets on the inside wall of the heat exchanger tube. If water drops collect in liquid form, they can then pool inside the heat exchanger and cause system instabilities and inefficiencies. The smaller the water particle size during heating in the heat exchanger tube 30, the faster the phase change to steam occurs. As the steam moves along the remainder of the coiled tube 30 as a gas, it absorbs more heat, and becomes dry super-heated steam.

FIG. 2 illustrates one embodiment of an on demand steam generating system incorporated into a combined heat and power (CHP) system 200. The basic system 100 of a working fluid reservoir 1, water pump 3 driven by BLDC motor 32, check valve 4, nozzle 5, heat exchanger 6, combustion chamber 7, sensors 8, 9 and controller 11 operate in a manner described above with respect to FIG. 1. The basic system 100 is arranged to deliver steam to a turbine-powered electrical generator 15 to generate electrical energy. A coolant pump 21 circulates coolant 23 through an exhaust intercooler 19 and a condenser 17 to collect heat energy from the combustion chamber exhaust and from the low pressure steam leaving the exhaust of the steam turbine 15, respectively. Coolant 23 is circulated through a heat exchanger 20 and the heat harvested from the condenser 17 and intercooler 19 is used to heat a building or for some other purpose, increasing the overall efficiency of the CHP system 200. Some heat harvested from the intercooler 19 could be employed to raise the temperature of the water before delivery to nozzle 5, reducing the heat needed to generate steam in the heat exchanger 6.

The disclosed system 200 is a "closed loop" working fluid system where the vast majority of working fluid is re-used, minimizing the need for new working fluid. Low pressure steam 16 leaving the turbine 15 is cooled and condensed in condenser 17 back to liquid water and returned to the coolant reservoir 1. Use of distilled water as a working fluid can reduce fouling and build up in the heat exchanger tubes 30 due to dissolved minerals present in most water. Further, re-use of the working fluid 2, 10, 16 means that any residual heat left after the turbine exhaust 16 is condensed is heat energy that does not need to be added to convert the liquid water back to steam, which increases the efficiency of the CHP system 200.

The combustion chamber 7 is an area where heat is contained and concentrated, facilitating heating of the heat exchanger tube or tubes 30. The chamber 7, which may be referred to as "the combustion chamber," is not limited to combustion only. Heat may be provided from an outside source, in which case the combustion chamber 7 provides an environment for the heat to surround and raise the temperature of the heat exchanger 6. The heat exchanger 6 is a device which facilitates the transfer of heat energy to the working fluid to phase change from liquid to gas and accumulate pressure. In the embodiment illustrated in FIG. 2, the heat exchanger 6 is one or more tubular metal coils 30 such as that illustrated in FIG. 6, which can withstand the temperatures and pressures of the combustion chamber and the gaseous working fluid 10. The geometry and material of the heat exchanger 6 and heat exchange tubes 30 can vary depending upon specific variables, including but not limited to: the rate at which heat is transferred from the chamber 7 to the working fluid in the heat exchange tube(s) 30, the volume, pressure and temperature of the gaseous working fluid output, spatial constraints, and economic factors such as material costs and manufacturing considerations. The heat exchanger 6 can be, but is not limited to a circular cross section metal coil, a finned tube, flat tube, or shell and tube heat exchanger, etc.

As the steam 10 leaves the heat exchanger 6, a temperature sensor 9 such as a thermocouple and a pressure sensor 8, such as a pressure transducer read the steam parameters (temperature and pressure) and relay corresponding pressure and temperature signals to the controller 11. The disclosed systems take 10 readings per second and average the ten readings over a one second period to arrive at a measured value for temperature and pressure. This technique can reduce the effect of erroneous readings, but adds some delay in the readings relative to what is actually happening in the steam generator. Using the mass flow of water as derived from operation of the water pump 3 (as described above) and/or a mass flow sensor (not shown), the controller 11 can then calculate how much heat is needed so the water flow entering the heat exchanger tube 30 can phase change to steam before leaving the heat exchanger 6. The controller 11, 24 balances the injection of water with the addition of heat energy to produce a steady flow of steam having the correct pressure and temperature for use in the turbine 15. In the disclosed embodiment, an electronic feedback loop maintains a steady state pressurized steam flow "set point" by adjusting the mass flow of water injected as well as the heat energy available in the combustion chamber 7 in response to signals from sensors 8 and 9. Other sensors, such as a mass flow meter on the water pump 3 could be employed to provide information to the controller 11.

Atomized water transitions to steam and expands rapidly, increasing the pressure in the heat exchanger tube 30 adjacent the atomizing nozzle 5. As the steam 10 fills the heat exchanger tube and connected steam lines, the pressure within the heat exchanger tube 30 increases, resulting in higher pressure opposing the injection of atomized water from the nozzle 5. Changes in differential pressure across the nozzle 5 result in changes in the flow of water through the nozzle 5. The water pump motor 32, water pump 3, nozzle 5, and heat exchanger tubes 30 are selected so that the water pump 3 can generate sufficient differential pressure across the nozzle 5 to overcome increased back pressure from steam being generated in the heat exchange tube 30. Increased differential pressure across the nozzle 5 results in increased water injection and increased steam flow, assuming sufficient heat energy to transition the injected water 2 to steam 10. Decreased differential pressure reduces water flow through the nozzle 5, resulting in a reduced demand for heat energy to transition the reduced flow of water 2 into steam 10. The water pump motor 32 is selected to have the capability of generating pressure at the nozzle 5 sufficient to overcome the back pressure in the heat exchanger tube 30 at a pre-determined maximum steam output pressure. The differential pressure across nozzle E3 necessary to atomize water into heat exchanger tube is approximately 10 psi. The disclosed differential pressure is specific to the disclosed design and nozzle 5 and is intended to serve as a non-limiting example. An alternative design could employ an active nozzle that would respond to signals from a controller to turn on, turn off or modulate flow through the nozzle. Such a nozzle would present control modalities in addition to those discussed in the present embodiments. Alternative configurations will have operating parameters dictated by component configurations and operating requirements.

The controller 11, 24 includes a user interface where the controller can be programmed with firmware to govern operation of the system 200. The firmware program will include a pre-determined "set point" representing a set of steam parameters, e.g., temperature and pressure that are to be generated by the on demand steam generator 100. A suitable controller can be constructed using a computer or a microcontroller or microprocessor and memory according to the preference of a designer. In the disclosed embodiment, a system controller 11 works in conjunction with a burner controller 24 to manage system functions. An operating program, to be executed by the controllers 11, 24 may be one or more sets of code executed separately in controllers 11 and 24, with operation of the burner controller 24 responsive to commands from the system controller 11. The system firmware may include one or more program loops such as those illustrated in FIGS. 4 and 5. Primary objectives of the controller are to: 1) manage cold start-up of the system to quickly achieve a stable steam flow output without human intervention; 2) monitor system operation, making adjustments as necessary to maintain stable steam production; 3) adjust system operation in response to changes in demand for steam; and 4) take corrective action or shut down the system in the event of an unsafe or unstable condition.

Figure 4:
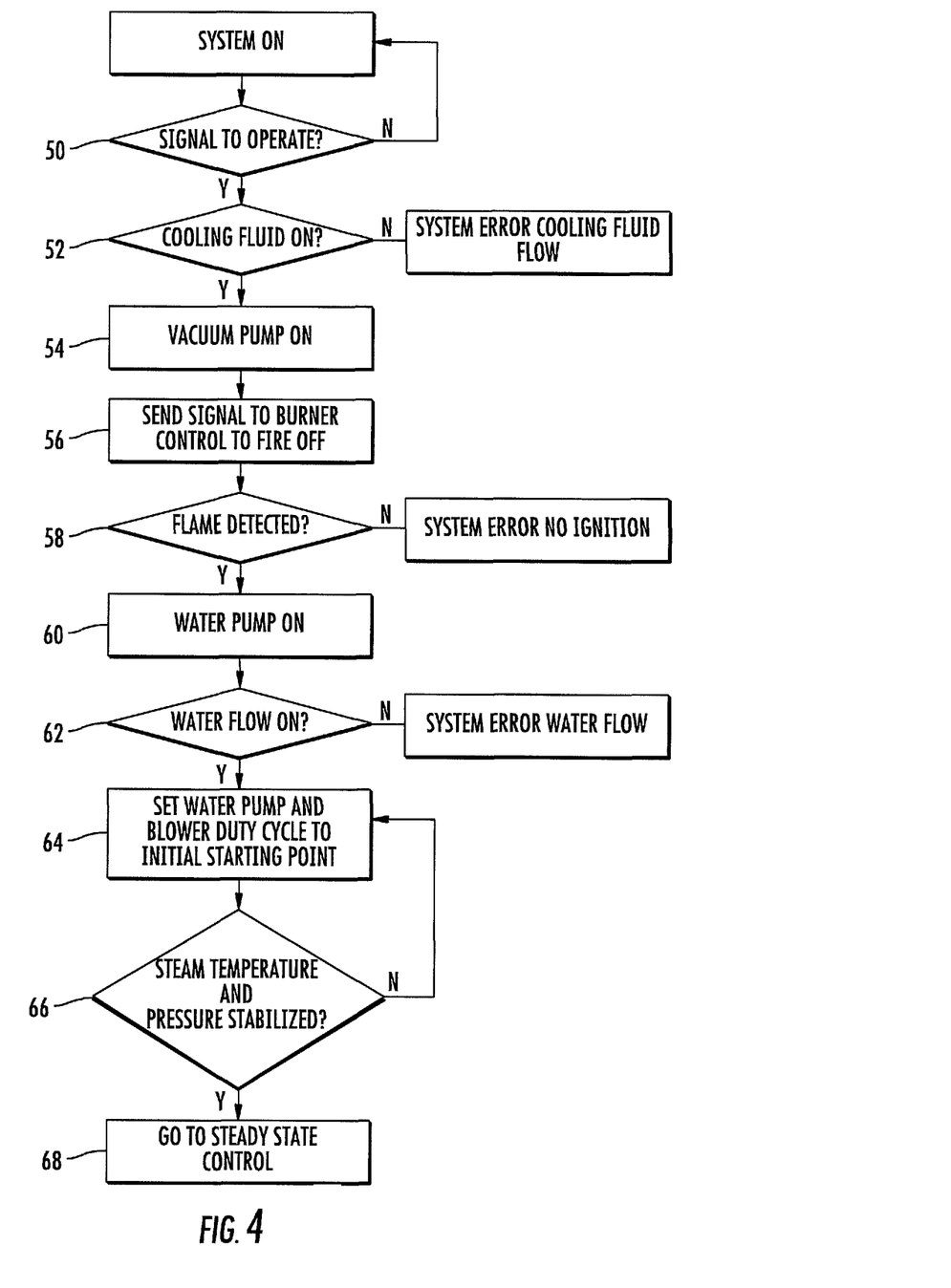
FIG. 4 is a flow chart illustrating an exemplary program steps executed at system start up according to aspects of the disclosure.

FIG. 4 illustrates a basic routine executed by the controller 11, 24 at startup of system 200 shown in FIG. 2. After applying power to the system, the controller looks for a start signal at 50. The controller then checks to see that coolant pump 21 is on and that coolant 23 is flowing at 52. If coolant is not flowing, then an error prevents further startup and a corresponding error notification is generated. If coolant is flowing, the controller 11 then turns on vacuum pump 18 at 54, which exhausts air from the turbine 15 and steam lines from heat exchanger 6. Vacuum of approximately −15 psi draws steam through the lines and turbine 15 and prevents accumulation of condensation at the outlet of the turbine 15. Vacuum or negative pressure at the exhaust of the turbine 15 is ideal for the disclosed micro steam turbine 15, but may not be required for all expanders. With coolant flowing and the vacuum pump 18 on, the system controller 11 sends a signal to the burner controller 24 to ignite at 56. If no flame is detected at 58, the controller 11, 24 stops the startup procedure and reports a corresponding error. If flame is detected, the controller 11 turns on water pump 3 at 60 and checks for water flow at 62. If water flow is not confirmed, the controller 11 stops the startup procedure and reports a corresponding error. If the burner 12 and water pump 3 are operating correctly, then the controller 11 sends signals to the water pump motor 32 and burner blower motor 34 corresponding to a starting set point.

In the disclosed system 200, the water pump motor 32 and the burner blower motor 34 are both variable output motors whose output is proportional to applied power. In the case of the burner blower motor 34, the burner 12 is configured to meter fuel according to the power applied to the blower motor 34, so in the disclosed system 200, power applied to the burner blower motor 34 is a proxy for heat energy input to the combustion chamber 7. Power applied to the water pump motor 32 and burner blower motor 34 is varied using pulse width modulation (PWM) as is known in the art. Other methods of motor control may be employed and the disclosed control scheme is intended as a non-limiting example.

During startup, conditions within the heat exchange tubes 30 change rapidly as the temperature in the combustion chamber rises and injected water begins to phase change to steam. It will be appreciated that there will be a time delay between turning on the burner at steps 56/58 of FIG. 4 and the commencement of water injection at steps 60/62, which allows the combustion chamber 7 and heat exchanger 6 to heat up. One example of a delay is 15 seconds between flame detection and the first injection of water. The temperature of the combustion chamber 7 could be measured directly or experimentation could be used to determine a heat output for the burner 12 and time that corresponds to the desired temperature. At step 64, the controller is programmed to retrieve or look up a set point for steam production to be achieved. In the disclosed embodiment, this set point corresponds to a duty cycle (PWM signal corresponding to applied power) to be applied to the water pump motor 32 and the burner blower motor 34. Power applied to water pump motor 32 corresponds to line pressure at the nozzle 5 and a mass flow of water through the nozzle (which will vary according to back pressure). Power applied to burner blower motor 34 corresponds to heat energy released into combustion chamber 7, as described above. The purpose of the initial set point is to give the controller 11, 24 initial operating parameters until sensors 8, 9 return signals confirming steam output suitable for the attached expander, such as turbine 15.

One example of initial set point values are a 25% duty cycle applied to the burner blower motor 34 and a duty cycle applied to the water pump motor 32 sufficient to produce about 4.6 mL/sec. water flow through nozzle 5. One example of an equation for water flow is: 5.0166*Ln(Pressure)−15.111, which was derived by measuring water flow needed to keep the steam temperature at 400° F. at multiple pressures, then adding a best fit curve. These initial set point values consistently bring the steam pressure up to 50 psi without overheating the system. These values are employed in a system using only proportional control equations. One factor affecting system stability is a lag in temperature readings from thermocouple-type temperature sensors. In a system using proportional control, it is possible to add a correction factor to the duty cycle applied to the water pump motor 32 to minimize temperature overshoot caused by thermocouple lag. One example of a correction factor is a value of 0.015*(Temp−400), with Temp being the thermocouple reading and 400 being the desired stable temperature of output steam. The resulting correction is positive when thermocouple readings are greater than 400° F. and negative when the readings are less than 400° F. It is believed that the use of proportional-integral-derivative (PID) control would allow faster heating and permit a less conservative start up procedure without overshoot or instability.

Pressure control is similar to water flow control but is linked to the duty cycle applied to the burner blower motor 34, since the energy released into the combustion chamber is directly related to the burner blower motor duty cycle. A pressure transducer 9 measures pressure before the turbine and sums it for 10 measurements. The average measured pressure is compared to the desired pressure and a proportional gain is applied to the blower motor duty cycle. On start-up, the difference in proportional gain for increasing blower motor duty cycle is less than for decreasing blower motor duty cycle by a larger amount than when the system has reached a steady state, to reduce the likelihood of temperature overshoot. For example, during startup when the average measured value is less than the desired pressure (calling for increased heat input), the correction is 0.007, and when the average measured value is greater than the desired pressure (calling for reduced heat input), the correction is 0.015. During steady state operation, the corresponding values are 0.01 and 0.015, respectively.

The initial set points allow the system to safely reach 50 psi, at which point the blower motor duty cycle is reduced to 22%. Once the system drops to 43 psi at the 22% duty cycle, automatic control is enabled, allowing the blower motor duty cycle to slowly increase by using a proportional gain equation until steam pressure steadies at 50 psi. To verify the system is stable, pressure boundaries of 48.5 psi and 51.5 psi and temperature boundaries of 380° F. and 415° F. are established. Once the system stays within those boundaries for 20 seconds, the system is considered stable and is allowed to ramp up in pressure to the desired value. When ramping up steam pressure under proportional gain control, the set point is increased by 1 psi increments, and allowing the pressure to rise to within 1.5 psi of the set point for 2 seconds before increasing the set point by another 1 psi. Similar methods are used during pressure decrease. This is a compromise due to the use of proportional gain and it is believed that use of PID control would alleviate or eliminate the necessity to use such methods.

Valves 13 and 14 are arranged to control when steam is delivered to the turbine 15. During startup, the first steam produced will be too cool and wet to be used in the turbine, so valve 13 is open and valve 14 is closed, diverting steam 10 around the turbine 15 to condenser 17. When temperature and pressure signals from sensors 8 and 9 are within a range suitable for the turbine 15, controller 11 closes valve 13 and opens valve 14, routing steam through the turbine to perform work such as generating electricity. This would typically occur at step 66/68 of FIG. 4. Valves 13 and 14 could be replaced with a steam trap or a clean steam separator (not shown), which would provide the similar functionality as valves 13 and 14 operated by controller 11. The system 200 and controller 11, 24 are configured to protect the micro steam turbine from input steam that could damage the turbine. Steam that is too cool and wet or steam that is too hot will damage the turbine, so the system 200 and controller 11, 24 are configured to produce superheated dry steam at an output temperature range of between 350° F. and 400° F., ideally approximately 400° F. Steam temperatures below 250° F. or above 450° F. represent the absolute boundaries of acceptable input steam for the micro steam turbine 15. The system 200 and controller 11, 24 are arranged to produce and deliver steam in the heart of the acceptable range and to prevent damage to the turbine from exposure to steam having properties outside the acceptable range.

To the steam generator 100, the attached expander appears as a flow restriction resisting flow of steam away from the nozzle end of the heat exchange tube 30. Except for an initial spin up of the turbine 15, the flow restriction should be fairly consistent, allowing the controller to enter a steady state control loop illustrated in FIG. 5. The steam turbine 15 requires a flow of super-heated dry steam at approximately 75 psi, and the controller 11, 24 is configured to balance the mass flow of water with applied heat energy to generate sufficient steam volume to maintain the required output pressure against the flow restriction of the turbine 15. For any given expander, the volume of steam generated at the output of the heat exchanger 6 during operation is balanced against the volume of steam passing through the expander, resulting in a steam pressure at pressure sensor 9. Increased steam production will tend to increase pressure at sensor 9 and increase the resulting work at the expander, while reduced steam production has the opposite effect. Alternatively, valves 13, 14 could be employed to control the volume of steam delivered to the turbine 15, and the resulting work performed, e.g., electrical energy generated by the electrical generator driven by the turbine 15.

As previously described, when sensors 8, 9 report the presence of steam temperature and pressure at the outlet of the heat exchanger 12 that are suitable for the turbine 15, controller 11 opens valve 14, closes valve 13 and enters a steady state control loop at 70. In the disclosed embodiment, the steady state control loop includes two overlapping subroutines 72, 74. The disclosed control loops 72, 74 incorporate proportional, integral, derivative (PID) calculations to guide actions of the controller, with the objective being a stable output of steam at the correct temperature and pressure. Use of PID calculations in control loops is well known to those skilled in the art and will not be described in detail here. PID control prevents excessive correction (overshoot), which can lead to undesirable system oscillations and instability.

In the disclosed on demand steam generating systems, the injection of water and the application of heat interact to produce the desired flow of steam, so the steady state program loop employs subroutines 72, 74 which constantly adjust power applied to the burner blower motor 34 and the water pump motor 32. At block 72, if steam pressure is not at the set point, controller performs a PID calculation to arrive at a correction to the blower motor duty cycle at 76, which roughly corresponds to heat energy input to the combustion chamber 7. The blower motor duty cycle is updated with the calculated correction at 78. The controller then calculates the water pump motor duty cycle based on the pressure sensor reading at 80 and updates the water pump motor duty cycle at 82. The program loop then checks the steam temperature at 84. If the measured temperature is not correct, the controller performs a PID calculation to arrive at a correction to the water pump motor duty cycle at 86 and updates the duty cycle of the water pump motor at 88. At the end of subroutine one (steps 72 and 76-88) the control loop returns to the beginning and checks steam pressure again at 72. If steam pressure is correct, then steam temperature is checked at 74. If steam temperature is not at the set point, then the controller performs a PID calculation to arrive at a correction to the water pump motor duty cycle at 90 and updates the water pump motor duty cycle at 92. At the end of subroutine two (steps 74, 90 and 92) the control loop returns to the beginning and checks steam pressure at 72. The steady state control loop of FIG. 5 runs continuously during operation of the system, repeating many thousands of times per second to maintain the required flow of steam at a predetermined temperature and pressure. While a control feedback loop with PID control calculations to stabilize steam output is described, the disclosed systems are not limited to this control scheme.

There are a variety of expanders that can be used to produce work from the flow of energetic gaseous working fluid produced by the disclosed systems, including a piston engine, Wankel engine, micro or large scale steam turbines, etc. Each expander may require specific system features, such as lubrication oil, downstream pressure drops to draw condensate through the expander, etc. The system illustrated in FIG. 2 employs a condensing micro steam turbine from Green Turbine which requires no oil lubrication but does require negative pressure on the exhaust to draw out any condensate. This alleviates any back pressure to the turbine, providing maximum efficiency. Not all systems that can benefit from the disclosed on demand steam generating systems will require a vacuum pump or be lubrication free. The system configuration will change based upon the chosen expander and system functionality, with the disclosed on demand steam generator and control system operating according to the same basic principles.

The disclosed on demand steam generating systems 100, 200 require a set point for work output. The work output set point is based upon the system's work output requirement. When the controller recognizes the work output requirements either through a preprogrammed input, a user interface where a set point value can be programmed, or through electrical or mechanical load recognition features such as a thermostat or demand for electrical energy, the system will create a set point for the desired work output. The flow of water and heat input are calculated and controlled to generate a flow of steam corresponding to the desired set point of work output. Once steam begins being generated inside the heat exchanger 6, new steam is continuously displacing steam already in the heat exchanger tube 30, resulting in a flow of steam 10 out of the heat exchanger 6 and towards the turbine 15 (or other expander). The disclosed systems 100, 200 include controllers 11, 24 programmed to respond to changes in load by establishing a new set point and adjusting operation of the system to generate steam output corresponding to the required work output, within system limitations. Steam output is matched to demand on a continuous basis, according to aspects of the disclosure.

Once the steam 10 begins to flow to an expander such as turbine 15, work output can be measured by many different variables (current, voltage, RPM, etc.) Work output at an expander may be measured by the controller and used to calculate the correct heat input and/or water mass flow required to maintain the corresponding steam production. System 200 is configured to monitor steam temperature and pressure at the outlet of the heat exchanger 6 and to maintain these parameters at values corresponding to a demand for work.

The disclosed power generation system may be employed wherever mechanical work or electrical energy is desired, e.g., transportation, electrical generation, etc. The disclosed system will not only generate electricity but also produce residual heat that can be recovered as useful heat for hot water and/or heat as shown in FIG. 2. In a combined heat and power configuration (CHP) configuration such as that shown in FIG. 2, the overall system efficiency can be increased to over 95% and as high as 99% by recovering the normally wasted residual heat for other uses (System efficiency= (Electricity out+Heat recovered)/Fuel burn). In FIG. 2, the heat exchanger 20 arranged to remove heat from the coolant 23 circulating in the coolant loop 17, 19, 20, 21 can be a forced air liquid-to-air heat exchanger, or a liquid-to-liquid heat exchanger in a hydronic heating system. The heat exchanger 20 can be arranged to provide either forced hot air or radiant heat to a dwelling. The cooling loop can also be replaced or complimented by a domestic hot water tank that will absorb heat that would otherwise be wasted. As shown in FIG. 2, coolant 23 is circulated through an exhaust intercooler 19 and condenser 17 to recover residual heat that would otherwise be wasted. Coolant 23 may be circulated first through condenser 17 and subsequently through intercooler 19, because a greater temperature differential between turbine exhaust 16 and coolant 23 is desirable for efficient condensation of turbine exhaust 16.

CHP systems incorporating the disclosed on demand steam generators may be configured with the capability of producing heat energy greater than needed for steam production, with the excess heat energy employed for other purposes. For example, if a CHP system is configured with a burner closely matched to the selected expander, there will be modest excess heat collected in the coolant, since most of the heat will be absorbed in the heat exchanger 6. In such an arrangement, the heat recovered in the coolant loop may be insufficient to meet demand for heat, for example to heat a structure on a cold day. Under such circumstances, an additional heat source would be necessary, duplicating much of the structure of the burner and combustion chamber already included in the disclosed systems 100, 200. Providing a more robust heat source would permit more widespread use of a CHP, and reduce or eliminate the need for supplementary heat sources according to aspects of the disclosure. The heat source such as burner 12 and coolant loop components 17, 19, 20, 21 can be designed to allow for the proper amount of heat to be absorbed in the coolant 23 to serve the additional heat demand and eliminate the need for an additional heat source. Designing a single combustion chamber 7 and heat source such as burner 12 that can generate heat energy sufficient to meet the full thermal load for a given installation provides a significant economic advantage by eliminating the equipment cost of the second heating source.

There are also applications where the thermal load is not required and the system is used to perform mechanical work or generate electrical energy. In such an application, the cooling loop will have the same functionality except the heat from the cooling fluid heat exchanger 20 would vent to the atmosphere instead of being used for some other purpose. In such circumstances, it is possible to configure a cooling loop extracting heat from the combustion chamber exhaust at 19 and the expander exhaust at 17 and add some of that heat energy into water delivered to the atomizing nozzle 5. Raising the temperature of the working fluid before injection reduces the amount of time and heat energy necessary to transition the water into steam, increasing system efficiency. It may be possible to raise the temperature of the water past its boiling point, in which case at least some of the water would "flash" directly to steam upon passing through the nozzle 5.

The disclosed on demand steam generator and control system may also be used to harvest waste heat energy from an existing heat source rather than burning a fuel inside a combustion chamber. This method for developing steam can be added to any system that produces waste heat, e.g. large internal combustion generators, kilns, industrial furnaces, etc. The system of FIG. 2 could be modified to work with an existing heat source. The combustion chamber 7 would not have a combustion source such as burner 12 and would not burn any fuel to produce heat. The heat exchanger 7 would be placed in a position (a flue or exhaust pipe) to be heated by exhaust from the original system before it is vented to the atmosphere. These exhaust gases generally carry a large amount of energy, normally wasted, which can be recovered. Approximately 30% of the heat generated by an internal combustion engine is wasted into the exhaust, which also tends to be relatively high temperature. The exhaust of internal combustion engines presents a large opportunity to recovery waste heat according to aspects of the disclosure.

In one disclosed embodiment of a control system, steady state work output is achieved by, but is not limited to, two closed-loop control algorithms operating together. Both control loops measure system variables and use that feedback to calculate adjustments to system variables to produce the desired steam output, as described above. The control routines may provide feedback to each other by incorporating the output of one control loop with the input or output of the other control loop. One objective of the control loops is to produce the desired work output using a calculated amount of heat input while keeping the steam at its desired steam temperatures and pressures. The disclosed apparatus and control system improve over the prior art by matching work output with heat energy input, efficiently maintaining a flow of steam in the superheated temperature range while having the capability to quickly change work output as desired.

Steady state refers to the constant flow of steam that will produce the desired work (electrical or thermal) output over the required period of time. If a change in work is required by the system, the control loops recognize the change in load and set the work output (set point) to the new desired load and maintain that output for the required period of time.

Once steam phase changes to its superheated properties, steam acts as an ideal gas. Following ideal gas laws and keeping volume constant, pressure and/or temperature can be monitored to regulate the mass flow of water according to the equation (PV=nRT).

Figure 5:
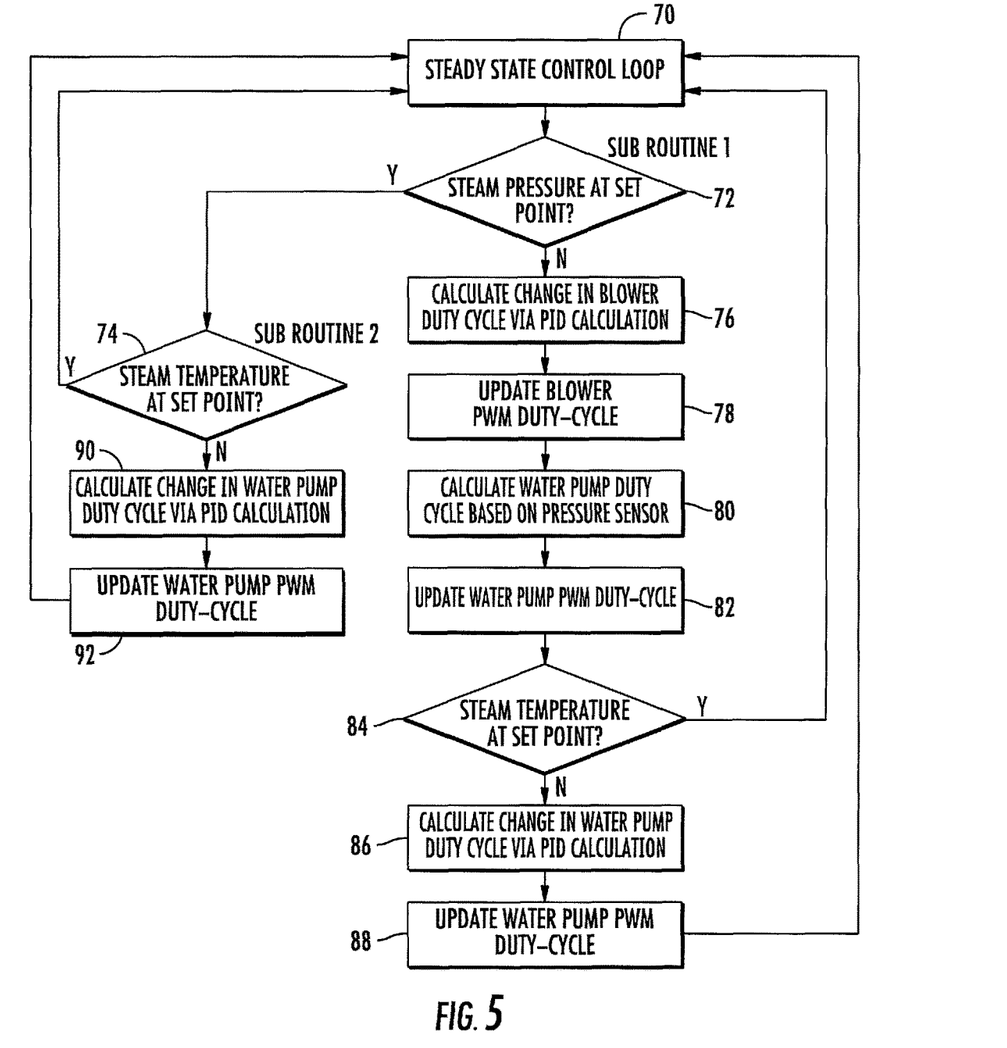
FIG. 5 is a flow chart illustrating exemplary program steps executed during steady state operation of the disclosed system according to aspects of the disclosure.

Subroutines 1 and 2 shown in FIG. 5 are linked by the physics of the system.

The governing equation for subroutine 1 is: W=Q where W is work output and Q is heat input.

The governing equation for subroutine 2 is: Q=m*C_v* (T_2-T_1).

Using the two governing equations of heat transfer and thermodynamics above where heat input, Q, is equal to the mass flow of the water m, multiplied by the specific heat of the water, C_v, multiplied by the change in water temperature. Also where work output, W, is equal to heat input, Q. T2 represents the steam temperature after heat is added to the system and T1 is the temperature of the water before it enters the heat exchanger to phase change to steam. The control program does not calculate the exact amount of heat required; instead the controller will use these equations to continually adjust the mass flow of water and heat input to keep the system at steady state in response to changes in system variables and demand for work (which affects set point). The system will set the heat input Q to an initial set point corresponding to a desired work output and then slowly increase the mass flow of water (m). The temperature and pressure of the resulting steam will begin to be read by the controller via signals from sensors 8, 9. As T2 temperature rises past its set point the controller will add more water and T2 will drop as excess heat is absorbed by the injected atomized water. Again as the system reaches steady state T2 will rise. This process will repeat until the steam temperature T2 is stable at the steady state set point. Once the temperature stabilizes, the required power will be monitored and if the power output is not at the correct set point, heat will be increased or decreased to accommodate the power demands. This will change the T2 temperature and the control loop illustrated in FIG. 5 will begin stabilizing steam temperature T2 again through the mass flow of water. Although this sounds like a lengthy process, with instant controller feedback times and almost instantaneous computing speeds, this process can be executed rather quickly and steady state flow of steam corresponding to a desired work or power output can be achieved in less than 1 minute.

The equations are used to represent relationships between the variables. They are not accurate for mathematical calculation. When phase changing from water to steam, each phase has a different specific heat. If these equations where used for the phase change from water to steam it would mathematically be incorrect. However these equations can be used to represent the correlations between heat input, work output, temperature and flow, which are the correlations the controller needs to correctly operate.

Embodiments of the disclosed on demand steam generating systems are shown and described for purposes of illustration. The disclosed embodiments are examples and are not intended to limit the scope of the appended claims. Variations of the disclosed structures, functions, and control methods will occur to those skilled in the art, all of which are intended to be encompassed by the claims.

What is claimed is:

1. A system for generating a variable flow of gaseous phase working fluid, comprising:
    a heat exchange tube arranged in a combustion chamber, said heat exchange tube having a first end receiving liquid phase working fluid and a second end from which gaseous phase working fluid leaves the heat exchange tube;
    a variable output heat source arranged to release a variable quantity of heat into said combustion chamber, said variable quantity of heat proportional to power applied to said variable output heat source, wherein said heat is absorbed by said liquid phase working fluid which transitions to a gaseous phase working fluid in said heat exchange tube;
    a variable flow rate source of liquid phase working fluid arranged to deliver liquid phase working fluid to the first end of said heat exchange tube, wherein a flow rate of said variable flow rate source is proportional to power applied to said variable flow rate source;
    an expander in a gaseous phase working fluid pathway connected to said heat exchange tube second end, said expander configured to use said variable flow of said gaseous phase working fluid at a pre-determined target temperature T to perform work;
    a temperature sensor arranged to generate a temperature signal TEMP corresponding to the temperature of said gaseous phase working fluid in said gaseous phase working fluid pathway;
    a controller operatively connected to said variable output heat source, said variable flow rate source of working fluid and said temperature sensor, wherein during operation of the system, the controller is configured to execute a program that comprises steps of:
    retrieving an initial set point from memory, said initial set point including an initial heat power level applied to said variable output heat source and an initial flow rate power level applied to said variable flow rate source;
    operating said variable output heat source according to said initial heat power level;
    operating said variable flow rate source of working fluid according to said initial flow rate power level;
    receiving said temperature signal TEMP;
    calculating a fluid flow correction factor according to the formula X*ΔT, where X is a predetermined constant and ΔT is calculated according to TEMP−T so that the fluid flow correction factor is positive when TEMP>T and negative when TEMP<T; and
    adjusting the flow rate power level by an amount equal to the fluid flow correction factor to provide an adjusted flow rate power level and operating said variable flow rate source according to the adjusted flow rate power level while operating said variable output heat source according to said initial heat power level,
    wherein said steps of operating, receiving, calculating and adjusting are performed in a control loop running continuously until said TEMP stabilizes within a pre-determined range relative to said target temperature T for a pre-determined period of time.

2. The system of claim 1, wherein power applied to said variable output heat source and said variable flow rate source is varied using pulse width modulation (PWM) and said initial heat power level is a PWM duty cycle applied to said variable output heat source, said initial flow rate power level is a PWM duty cycle applied to said variable flow rate source.

3. The system of claim 1, wherein said initial flow rate power level produces a flow rate of liquid phase working fluid generating a flow of gaseous phase working fluid from said heat exchange tube second end at said predetermined target temperature T when exposed to a quantity of heat corresponding to said initial heat power level.

4. The system of claim 1, wherein the liquid phase working fluid is water, the gaseous phase working fluid is steam, and the target temperature T corresponds to steam in a superheated temperature range.

5. The system of claim 1, wherein said expander comprises a turbine coupled to an electric generator.

6. The system of claim 1, wherein said heat exchange tube is coiled within said combustion chamber.

7. The system of claim 1, wherein said variable output heat source is a burner arranged to combust fuel within said combustion chamber.

8. The system of claim 1, wherein the liquid phase working fluid is water, said gaseous phase working fluid is superheated steam, said expander is a steam turbine operatively connected to drive an electric generator, and said system further comprises:
a condenser fluidly connected to an outlet of said steam turbine, in which steam leaving the steam turbine is cooled and condensed to liquid form, resulting in reduced pressure at the outlet of said steam turbine.

9. The system of claim 8, further comprising a closed working fluid path from a reservoir of working fluid, through said heat exchange tube, said steam turbine, said condenser and back to said reservoir of working fluid.

10. A method of generating a flow of gaseous working fluid comprising steps of:
exposing a heat exchange tube having first and second ends to a variable output heat source, a variable quantity of heat generated by said variable output heat source being proportional to power applied to said variable output heat source;
providing a variable flow rate source of liquid phase working fluid in communication with a first end of said heat exchange tube, a flow rate of said variable flow rate source proportional to power applied to said variable flow rate source and said liquid phase working fluid absorbing heat from said variable output heat source which transitions to a gaseous phase working fluid in said heat exchange tube;
connecting a gaseous working fluid pathway from said heat exchange tube second end to a turbine driven electric generator;
measuring the temperature of the gaseous phase working fluid in said gaseous phase working fluid pathway and generating a temperature signal TEMP corresponding to the temperature of said gaseous phase working fluid in said gaseous phase working fluid pathway;
operating said variable output heat source according to an initial heat power level;
operating said variable flow rate source of working fluid according to an initial flow rate power level;
receiving said temperature signal TEMP;
calculating a fluid flow correction factor according to the formula X*ΔT, where X is a predetermined constant and ΔT is calculated according to TEMP−T so that the fluid flow correction factor is positive when TEMP>T and negative when TEMP<T; and
adjusting the initial flow rate power level by an amount equal to the fluid flow correction factor to provide an adjusted flow rate power level and operating said variable flow rate source according to the adjusted flow rate power level while operating said variable output heat source according to said initial heat power level, wherein said steps of operating, receiving, calculating and adjusting are performed in a control loop running continuously until said TEMP stabilizes within a pre-determined range relative to said target temperature T for a pre-determined period of time.

11. The method of claim 10, comprising:
providing a controller operatively connected to said variable flow rate source, said variable output heat source, and said temperature signal TEMP, said controller including memory and a processor that executes a program including the steps of operating, receiving, calculating and adjusting;
deriving a relationship between a power level applied to the variable output heat source and the power level applied to the variable flow rate source by measuring fluid flow needed to keep said temperature signal TEMP within said predetermined range relative to said target temperature T for a given heat output from said variable output heat source at multiple pressures, where the initial flow rate power level produces a flow rate of liquid phase working fluid generating a flow of gaseous phase working fluid from said heat exchange tube second end within said predetermined range of said target temperature T when exposed to a quantity of heat corresponding to said initial heat power level;
storing said initial heat power level and said initial flow rate power level in said memory as an initial set point; and
in response to a demand for gaseous phase working fluid, retrieving said initial set point from said memory and using said initial heat power level to operate said variable output heat source and said initial flow rate to operate said variable flow rate source.

12. The method of claim 11, comprising:
after said TEMP has stabilized within said predetermined range of said target temperature T for said predetermined period of time, the controller selects a work output set point based upon a demand for gaseous phase working fluid, said work output set point including a steady state heat power level and a steady state flow rate power level corresponding to a flow of gaseous phase working fluid sufficient to meet said demand.

13. The method of claim 10, wherein said liquid phase working fluid is water and said gaseous phase working fluid is steam, said method comprising:
providing a condenser to cool gaseous phase working fluid leaving said turbine, resulting in a flow of water from said condenser;
collecting said water in a reservoir, and
evacuating said gaseous phase working fluid pathway and said steam turbine by application of negative pressure at an outlet of said turbine.

14. The method of claim 13, comprising:
connecting said reservoir to said variable flow rate source, thereby forming a closed loop in which water is recirculated.

15. The method of claim 11, wherein said liquid phase working fluid is water, said gaseous phase working fluid is steam, and said target temperature T corresponds to dry superheated steam.

* * * * *